(12) United States Patent
Cho et al.

(10) Patent No.: US 9,608,484 B2
(45) Date of Patent: Mar. 28, 2017

(54) MOTOR AND ROTOR OF A MOTOR HAVING A PLURALITY OF MAGNET GROUPS

(75) Inventors: Jin-Woo Cho, Seongnam-si (KR);
Seong-Taek Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 802 days.

(21) Appl. No.: 13/370,967

(22) Filed: Feb. 10, 2012

(65) Prior Publication Data

US 2013/0088112 A1   Apr. 11, 2013

(30) Foreign Application Priority Data

Oct. 10, 2011   (KR) .................. 10-2011-0103239

(51) Int. Cl.
*H02K 21/12* (2006.01)
*H02K 37/00* (2006.01)
*H02K 1/22* (2006.01)
*H02K 1/27* (2006.01)

(52) U.S. Cl.
CPC .................................. *H02K 1/2793* (2013.01)

(58) Field of Classification Search
CPC .................................. H02K 1/27; H02K 21/14
USPC .............. 310/49.22, 154.25, 156.01, 156.32, 310/156.33, 156.34, 156.37, 156.48, 310/156.51, 156.52, 156.72, 156.82, 310/266–268, 273
See application file for complete search history.

(56) References Cited

U.S. PATENT DOCUMENTS

| 5,245,238 | A | 9/1993 | Lynch et al. |
| 6,833,647 | B2* | 12/2004 | Saint-Michel ......... H02K 21/24 |
| | | | 310/156.31 |
| 7,535,145 | B2 | 5/2009 | Murakami |
| 7,554,226 | B2 | 6/2009 | Kojima et al. |
| 7,732,973 | B2* | 6/2010 | Bojiuc .......................... 310/268 |
| 2005/0001503 | A1* | 1/2005 | Hans ..................... H02K 1/2766 |
| | | | 310/156.53 |
| 2006/0284507 | A1* | 12/2006 | Murakami ............... 310/156.37 |
| 2007/0018520 | A1 | 1/2007 | Kaneko et al. |
| 2007/0080598 | A1* | 4/2007 | Naruse ................. H02K 1/2793 |
| | | | 310/156.56 |
| 2008/0024027 | A1 | 1/2008 | Aydin et al. |
| 2011/0084567 | A1 | 4/2011 | Ichiyama |

FOREIGN PATENT DOCUMENTS

| CN | 1897419 A | 1/2007 |
| CN | 1945941 A | 4/2007 |
| DE | 10 2007 038 668 A1 | 11/2014 |

(Continued)

OTHER PUBLICATIONS

Communication dated Nov. 28, 2014, issued by the State Intellectual Property Office of the People's Republic of China in counterpart Chinese Application No. 201210382817.0.

(Continued)

*Primary Examiner* — Jose Gonzalez Quinones
(74) *Attorney, Agent, or Firm* — Sughrue Mion, PLLC

(57) ABSTRACT

A motor includes a first rotor and a second rotor which are disposed at opposite sides of a stator, and each of the first rotor and the second rotor includes a plurality of modules, each including a pair of permanent magnets and a connection unit which connects ends of the permanent magnets.

24 Claims, 14 Drawing Sheets

(56) References Cited

FOREIGN PATENT DOCUMENTS

| | | | |
|---|---|---|---|
| EP | 1734645 | A2 | 12/2006 |
| EP | 2184838 | A1 | 5/2010 |
| JP | 61-244249 | A | 10/1986 |
| JP | 64-40754 | A | 2/1989 |
| JP | 04312334 | A * | 11/1992 |
| JP | 2006-14399 | A | 1/2006 |
| JP | 2006-20442 | A | 1/2006 |
| JP | 2006-304474 | A | 11/2006 |
| JP | 2006-340537 | A | 12/2006 |
| JP | 2006-353009 | A | 12/2006 |
| JP | 2006-353009 | A | 12/2006 |
| JP | 2009-44866 | A | 2/2009 |
| JP | 2009-219194 | A | 9/2009 |
| JP | 2010-233438 | A | 10/2010 |
| JP | 2010279185 | A * | 12/2010 |
| JP | 4649625 | B1 | 3/2011 |

OTHER PUBLICATIONS

Communication dated Apr. 5, 2016, issued by the Japanese Patent Office in counterpart Japanese Patent Application No. 2012-224440.
Communication dated Jan. 18, 2016, issued by the European Patent Office in counterpart European Application No. 12186409.4.

* cited by examiner

US 9,608,484 B2

MOTOR AND ROTOR OF A MOTOR HAVING A PLURALITY OF MAGNET GROUPS

CROSS-REFERENCE TO RELATED APPLICATION

This application claims priority under 35 U.S.C. §119(a) from Korean Patent Application No. 10-2011-0103239, filed on Oct. 10, 2011, in the Korean Intellectual Property Office, the entire disclosure of which is incorporated herein by reference in its entirety.

BACKGROUND

Field

Apparatuses consistent with exemplary embodiments relate to a motor capable of maintaining high power during high-speed operation, and a rotor for use in the motor.

Description of the Related Art

A motor may be classified as a permanent magnet synchronous motor (PMSM), an induction motor, a switched reluctance motor (SRM), or the like. A PMSM uses a permanent magnet and can be manufactured to be small. Also, a PMSM has a high power density and efficiency. Thus, PSMMs have been increasingly used in hybrid vehicles and electronic vehicles.

A permanent magnet for use in a PMSM is generally made of a rare-earth material. For example, the permanent magnet may be an NdFeB magnet which has good properties with respect to residual magnetism and coercive force. However, the supply of most rare-earth minerals is finite. Thus, rare-earth products are very costly and the price of such products is very volatile.

Thus, to avoid depending on rare-earth materials, new materials which can replace rare-earth materials are required, or a technology for a driving motor which does not use rare-earth materials but has the same performance as a motor that uses rare-earth materials should be developed.

SUMMARY

According to an aspect of an exemplary embodiment, there is provided a motor including: a first rotor configured to be disposed on a first side of a stator and a second rotor configured to be disposed on a second side of the stator, opposite the first side. The first rotor includes a plurality of first modules, each of which comprises a pair of first permanent magnets, spaced apart from each other, and a first connection unit which connects ends of the first permanent magnets. The second rotor includes a plurality of second modules, each of which comprises a pair of second permanent magnets, spaced apart from each other, and a second connection unit which connects ends of the second permanent magnets.

Each of the first modules may further include a first core disposed between the first permanent magnets, and each of the second modules may further include a second core disposed between the second permanent magnets.

The first rotor may further include a plurality of third cores, each disposed between a pair of adjacent first modules, and the second rotor ma further include a plurality of a fourth cores, each disposed between a pair of adjacent second modules.

The first rotor may further include a fifth core disposed on a side of the first modules, and the second rotor may further include a sixth core disposed on a side of the second modules.

The plurality of first modules may be an even number of first modules, spaced apart from one another, and the plurality of second modules may be an even number of second modules, spaced apart from one another.

Each of the first connection units comprises outer portions which are made of a non-magnetic material or air, and a central portion, between the outer portions, which is made of a permanent magnet. Each of the second connection units may include outer portions which are made of a non-magnetic material or air, and a second portion, between the outer portions, which is made of a permanent magnet.

Each of the plurality of first connection units and each of the plurality of second connection units is made of a non-magnetic material or air.

Each of the plurality of first cores and each of the plurality of second coes may be made of a magnetic material.

The plurality of first modules may be arranged circumferentially around the first rotor and the plurality of second modules may be arranged circumferentially around the second rotor, and the first modules are offset from the plurality of second modules in a circumferential direction.

Each of the plurality of first modules extends in a radial direction of the first rotor, and each of the plurality of second modules extends in a radial direction of the second rotor.

The first permanent magnets may extend in a direction which forms a predetermined, non-zero, angle with respect to a radius of the first rotor, an the second permanent magnets may extend in a direction which forms the predetermined angle with respect to a radius of the second rotor.

Other exemplary features and aspects may be apparent from the following detailed description, the drawings, and the claims.

Figure 1:
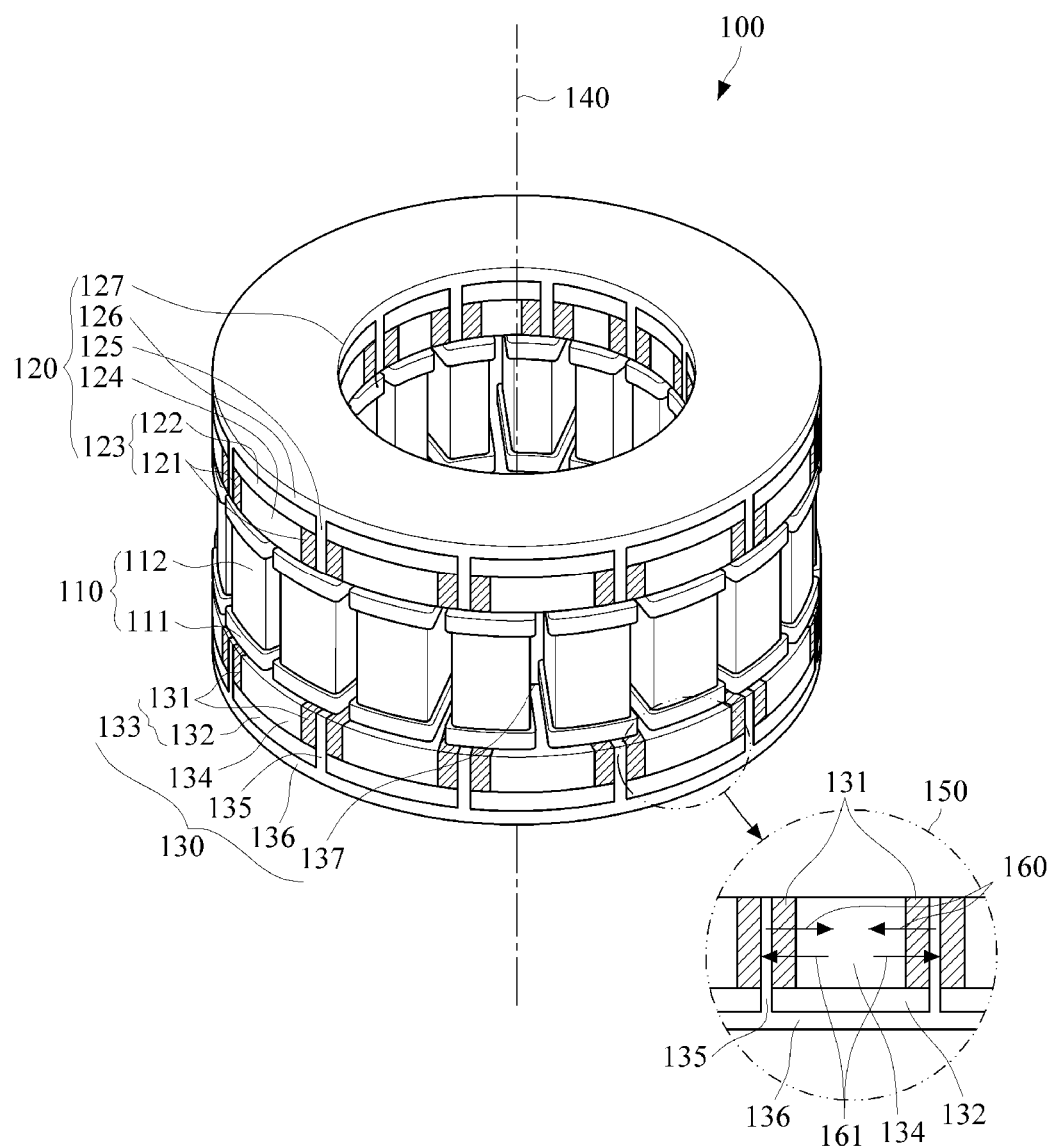
FIG. 1 is a diagram illustrating a perspective view of an exemplary motor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a perspective view of an exemplary motor.

Referring to FIG. 1, motor 100 may include a stator 110, a first rotor 120, and a second rotor 130. The motor 100 may be an axial air gap motor.

The stator 110 may include at least one slot 111 and a coil 112 that is wound on the slot 111. The slots 111 may be disposed radially around the motor. The slots 111 may be fixedly coupled to a housing that accommodates elements included in the motor 100. Thus, while the first and second rotors 120 and 130 may be coupled to a shaft and rotated along with the shaft, the stator 110 may remain not-rotated since it is coupled to the housing.

The first rotor 120 may be spaced apart from one side of the stator 110.

The first rotor 120 may include a plurality of first modules 123. Each of the first modules 123 may include a pair of first permanent magnets 121 disposed apart from each other and a first connection unit 122 connecting ends of the first permanent magnets 121. The first modules 123 may be arranged circumferentially around a rotational axis 140 of the motor 100. The rotational axis 140 corresponds to an axis around which the first and second rotors 120 and 130 rotate, as shown in FIG. 1.

The second rotor 130 may be arranged on the other side of the stator 110, spaced apart from the first rotor 120. That is, the first and second rotors 120 and 130 are arranged on opposite sides of the stator 110, spaced apart from each other.

The second rotor 130 may include a plurality of second modules 133. Each of the second modules 133 may include a pair of second permanent magnets 131 disposed apart from each other and a second connection unit 132 connecting ends of the second permanent magnets 131. The second modules 133 may be arranged circumferentially around the rotational axis 140.

The pair of first permanent magnets 121 may be parallel to each other, in a V-shaped configuration, or may have another arrangement. Similarly, the pair of second permanent magnets 131 may be arranged in parallel to each other, in a V-shaped configuration, or in another arrangement.

The first connection unit 122 may connect ends of the first permanent magnets 121. For example, the first connection unit 122 may connect ends of the first permanent magnets 121, which are outermost from the stator 110.

The first connection unit 122 and the second connection unit 132 may be made of a non-magnetic material or air. In the case of air, the connection units 122 and 132 may be empty spaces. In that case, the first and second permanent magnets may be connected by other elements.

The first rotor 120 may further include a first core 124 interposed between each pair of the first permanent magnets 121.

The second rotor 130 may further include a second core 134 interposed between each pair of the second permanent magnets 131.

The first rotor 120 may further include a third core 125 interposed between each adjacent pair of the first modules 123.

The second rotor 130 may further include a fourth core 135 interposed between each adjacent pair of the second modules 133.

The first rotor 120 may further include a fifth core 126 disposed on one side of the first connection unit 122. For example, the fifth core 126 may be plate-shaped, and disposed over the first modules on a side away from the stator 110.

The second rotor 130 may further include a sixth core 136 disposed on one side of the second connection unit 132. For example, the sixth core 136 may be plate-shaped, and disposed over the second modules on a side away from the stator 110.

Figure 2A:
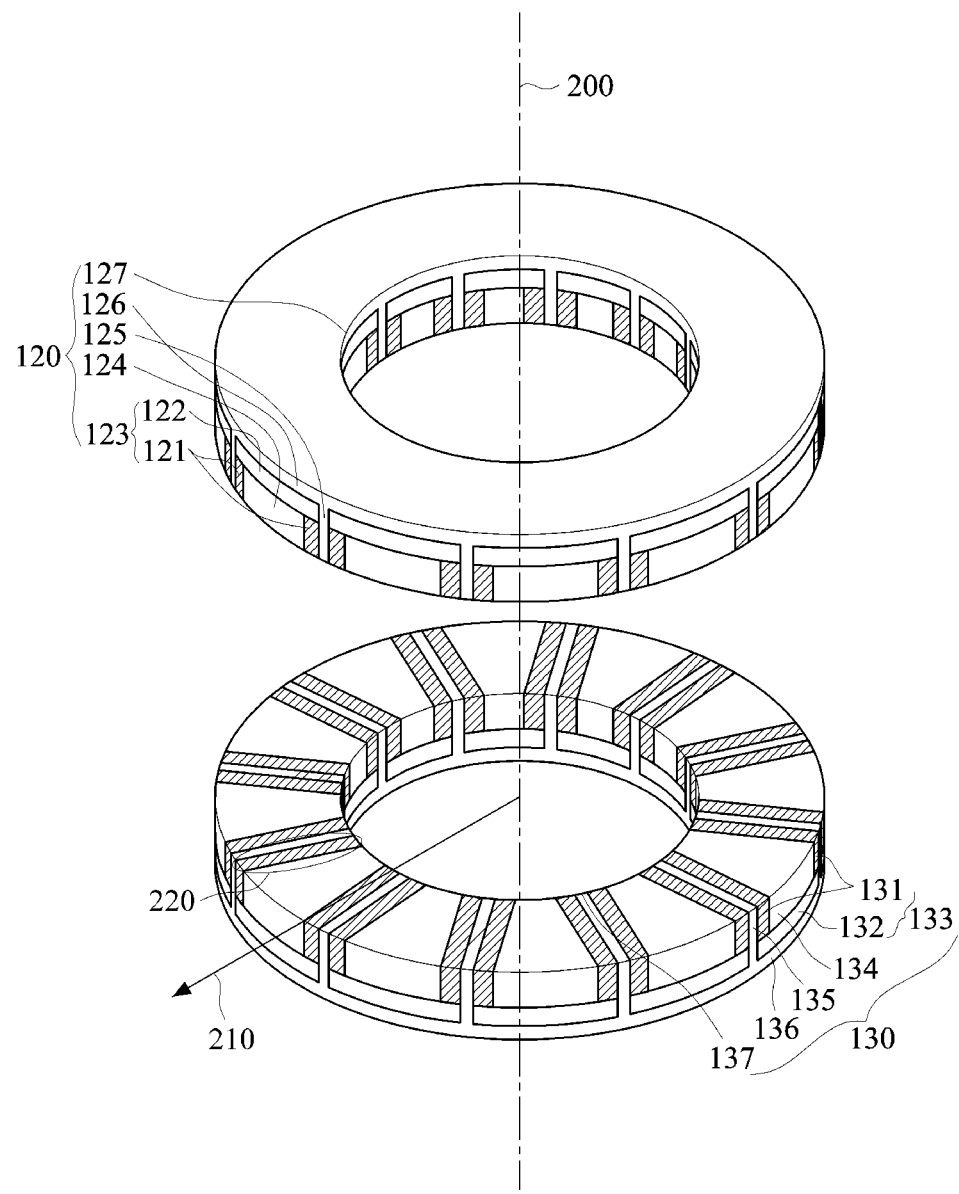
FIGS. 2A and 2B are diagrams illustrating exploded views of the motor illustrated in FIG. 1.

The third core 125 and the fifth core 126 may be a single, integrated piece, and the fourth core 135 and the sixth core 136 may be a single, integrated piece, as shown in FIGS. 1 and 2A.

The first rotor 120 may include a first hole 127 that can be coupled with a shaft (not illustrated).

The second rotor 130 may include a second hole 137 that can be coupled with the shaft.

The first core 124, the second core 134, the third core 125, the fourth core 135, the fifth core 126, and the sixth core 136 may be made of a soft magnetic material.

Referring to a diagram 150 that enlarges a part of the second module 133, a magnetization around the second permanent magnets 131 may be generated in a direction 160 from an outside to an inside of the second modules through the second permanent magnets 131, or in a direction 161 from an inside to an outside of the second modules through the second permanent magnets 131. Magnetization around the first module 123 may be generated in a similar manner as the second module 133. The permanent magnets may be made of a hard magnetic material.

There may be provided an even number of first modules 123 and an even number of second module 133. One module may form an N pole, and an adjacent module may form an S pole. In addition, an even number of the modules may be disposed a predetermined distance apart from one another.

The modules spaced apart from one another allow magnetic flux to flow smoothly through the cores 125, 126, 135, and 136 present in spaces between modules. Thus, inductances of a Q-axis that pass through the spaces between the modules are increased, and the connection units prevent leakage of magnetic flux, so that the motor can maintain high power during high-speed operation.

Figure 2B:
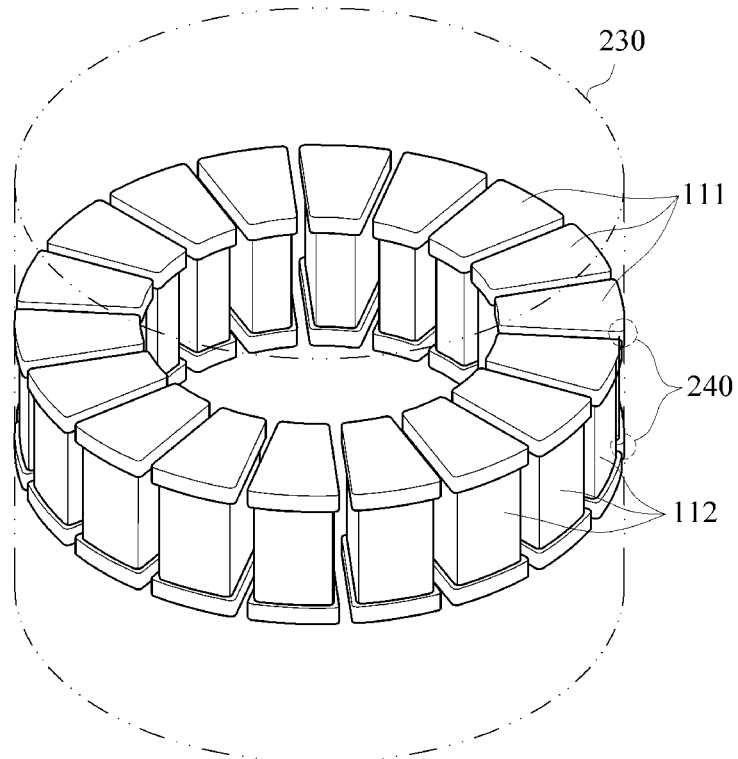

FIGS. 2A and 2B are diagrams illustrating exploded views of the motor illustrated in FIG. 1.

FIG. 2A is a diagram illustrating first and second rotors of the motor illustrated in FIG. 1.

Referring to FIGS. 1 and 2A, the first rotor 120 may include a plurality of the first modules 123. Each of the first modules 123 may include a pair of first permanent magnets 121 and the first connection unit 122 connecting ends of the first permanent magnets 121. The first modules 123 may be arranged circumferentially around the rotational axis 140.

The second rotor 130 may include a plurality of second modules 133. Each of the second modules 133 may include a pair of second permanent magnets 131 and the second connection unit 132 connecting ends of the second permanent magnets 131. The second modules 133 may be arranged circumferentially around the rotational axis 140.

The first modules 123 may extend in a wedge-like shape along a radial direction 210 which is normal to the direction of the rotational axis 140. For example, each of the first modules 123 may extend from an outer circumferential surface to an inner circumferential surface (as shown by reference numeral 220 in FIG. 2A). For another example, each of the first modules 123 may only partially extend from the outer circumferential surface to the inner circumferential surface.

The second modules 133 may extend in a wedge-like shape along the radial direction 210 which is normal to the direction of the rotational axis 140 in the same manner as the first modules 123.

FIG. 2B is a diagram illustrating only a stator of the motor illustrated in FIG. 1.

Referring to FIGS. 1 and 2B, the stator 110 may include at least one slot 111 and a coil that can be wound on the slot 111.

The slots 111 may be arranged circumferentially around the stator 110. The slots 111 may be fixed to a housing 230 that accommodates elements of the motor 100. For example, a portion 240 of each slot 111 may be fixed to the housing 230. The form of fixation may vary. While the rotors 120 and 130 coupled to the shaft are rotated along with the shaft, the stator 110 remains not-rotated since it is fixed to the housing 230.

Figure 3A:
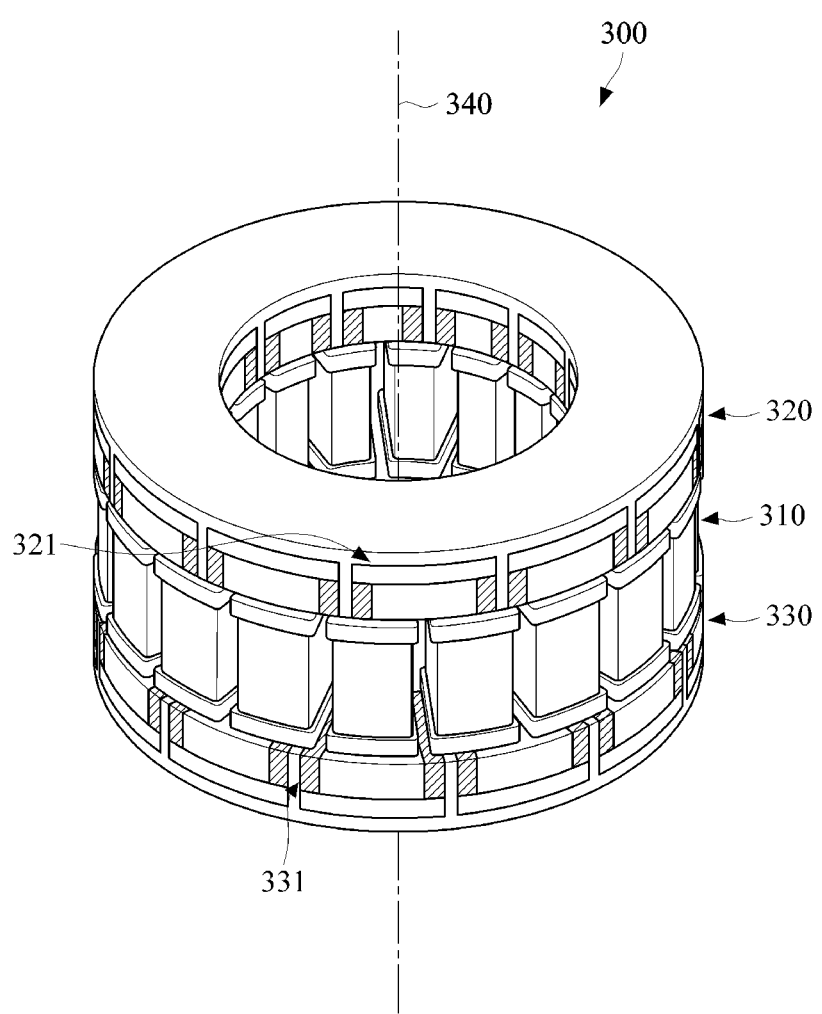
FIGS. 3A and 3B are diagrams for explaining an exemplary configuration for reducing a torque ripple.
Figure 3B:
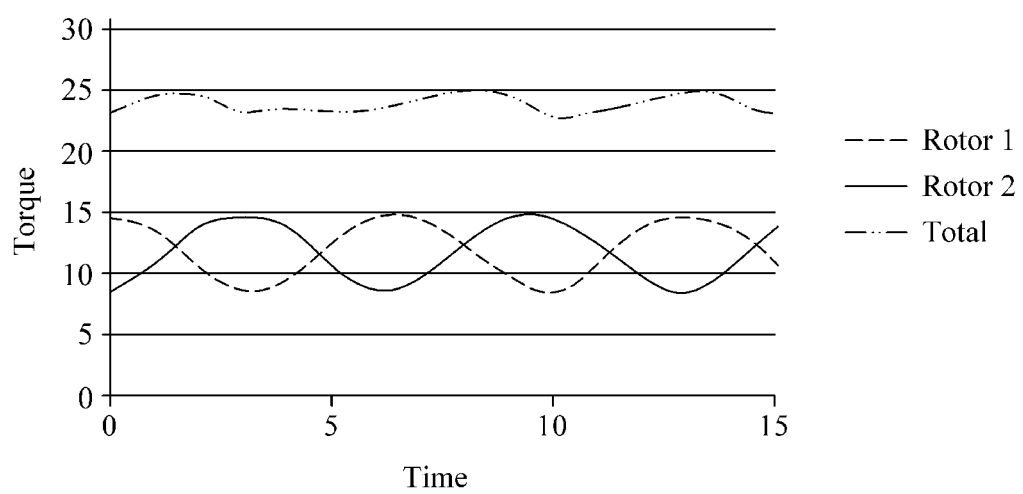

FIGS. 3A and 3B are diagrams for explaining an exemplary configuration for reducing a torque ripple.

Referring to FIG. 3A, the motor 300 may include a stator 110, a first rotor 120, and a second rotor 130.

The first module 123 included in the first rotor 120 and the second module 133 included in the second rotor 130 may be misaligned from each other relative to the rotational axis 140. In other words, the first module 123 and the second module 133 may not be aligned with each other in a direction parallel to the rotational axis 140, but may be misaligned from each other. As such, the misalignment of the modules 123 and 133 may cause the magnitude and phase of torque generated by the first rotor 120 and the second rotor 130 to change over time.

Referring to FIG. 3B, a magnitude of the torque generated by the first rotor 120 over time is illustrated, and a magnitude of the torque generated by the second rotor 130 over time is illustrated. In addition, the total value of the torques generated by the first rotor 120 and the second rotor 130 is illustrated. As shown in FIG. 3B, the magnitude of torques generated by the first rotor 120 and the second rotor 130 changes over time, and thus the total value of the torques generated by the first rotor 120 and the second rotor 130 has a small ripple. Accordingly, in the example, the torque ripple produced by a motor can be reduced.

Figure 4A:
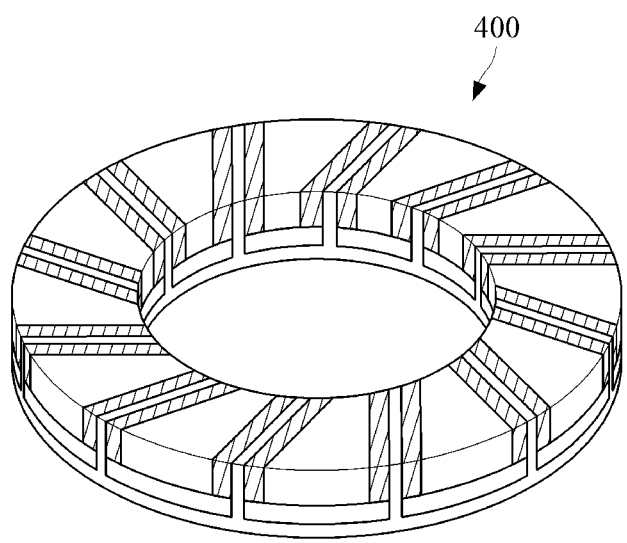
FIGS. 4A and 4B are diagrams for explaining another exemplary configuration for reducing a torque ripple.
Figure 4B:
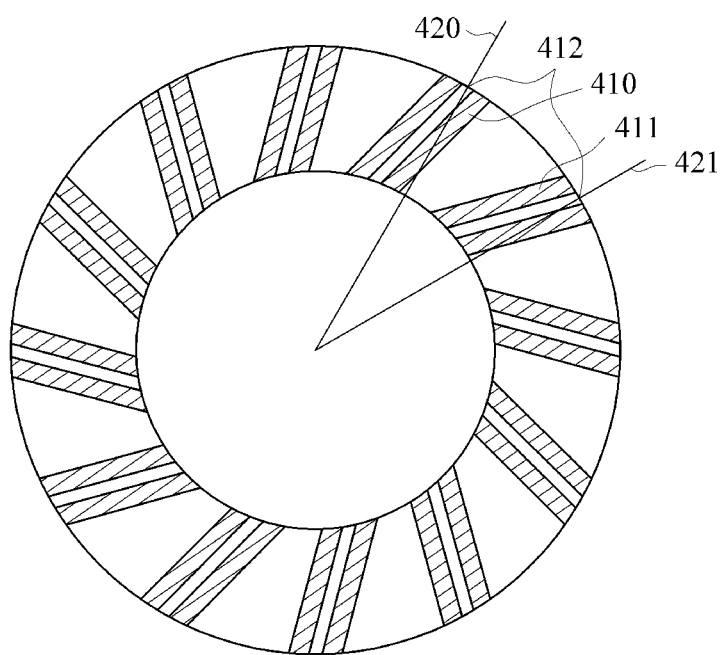

FIGS. 4A and 4B are diagrams for explaining another exemplary configuration for reducing a torque ripple.

FIG. 4A is a diagram illustrating a perspective view of an example of a rotor 400, and FIG. 4B is a diagram illustrating a plan view of the rotor 400 illustrated in FIG. 4A.

Referring to FIGS. 4A and 4B, the rotor 400 may include a pair of permanent magnets 410 and 411.

A first radial line 420 and a second radial line 420 extend from a center of the rotor 400 to each of two points 412 on a circumference of the rotor 400.

The first permanent magnet 410 may be disposed to not be in parallel to the first radial line 420. In other words, the first permanent magnet 410 is not parallel to, but forms at a predetermined angle with a radius of the rotor 400.

The second magnet 411 may be disposed to not be in parallel to the second radial line 421. In other words, the second permanent magnet 411 is not parallel to, but forms a predetermined angle with a radius of the rotor 400.

Each pair of the magnets 410 and 411 may be parallel to each other, each forming the same angle with respect to a radius of the rotor 400, as shown in FIG. 4B.

The rotor 400 may include have a plurality of pairs of permanent magnets having the same arrangement as the pair of the first and second permanent magnets 410 and 411.

As such, since the permanent magnets 410 and 411 are arranged on the rotor 400 to be at an angle with respect to a radial direction, a torque ripple generated by a motor can be reduced.

Figure 5A:
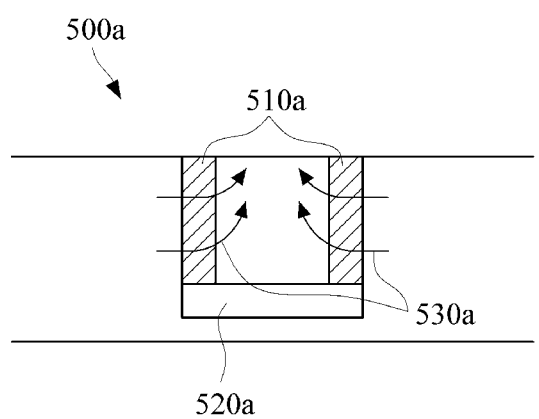
FIGS. 5A, 5B, and 5C are diagrams illustrating exemplary modules included in a motor.
Figure 5B:
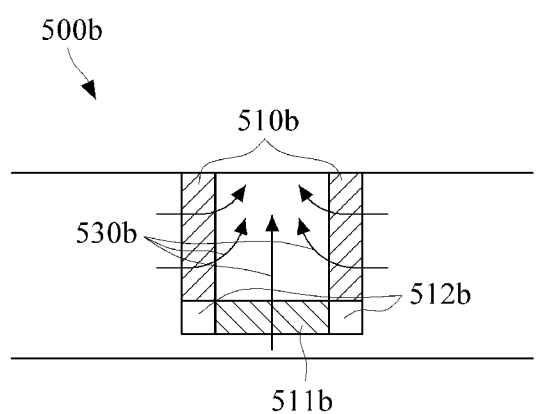
Figure 5C:
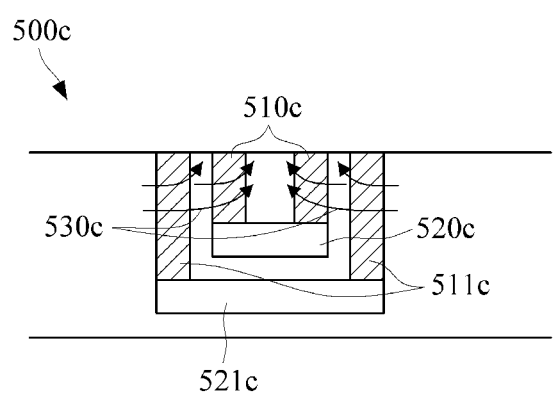

FIGS. 5A, 5B, and 5C are diagrams illustrating exemplary modules included in a motor.

Referring to FIG. 5A, rotor 500a may include a plurality of modules, each comprising a pair of first permanent magnets 510a and a first connection unit 520a. The first connection unit 520a may connect ends of the first permanent magnets 510a. In this case, magnetization may be generated in a direction 530a from an outside to an inside of the module through the first permanent magnets 510a or vice versa.

Referring to FIG. 5B, rotor 500b may include a plurality of modules, each comprising a pair of first permanent magnets 510b and a first connection unit comprising a middle portion 511b and edges 512b.

The first connection unit may connect ends of the pair of first permanent magnets 510b to each other.

The middle portion 511b of the first connection unit may be a permanent magnetic and the edges 512b may be made of a non-magnetic material or air. In this case, magnetization may be generated in a direction 530b from an outside to an inside of the module through the permanent magnets 510b and 511b or vice versa.

In comparison with the rotor 500a illustrated in FIG. 5A, the rotor 500b includes an additional permanent magnet 511b, and thus the magnetic flux generated by the permanent magnets 510b and 511b can be increased. Consequently, the performance of the motor can be improved.

Referring to FIG. 5C, rotor 500c may include a plurality of modules, each comprising a pair of first permanent magnets 510c, a first connection unit 520c, a pair of second permanent magnets 511c and a second connection unit 521c.

The first connection unit 520c may connect ends of the pair of first permanent magnets 510c to each other. A middle portion of the first connection unit 520c may be a permanent magnet like the middle portion 511b in FIG. 5B.

The pair of second permanent magnets 511c may be spaced apart from the pair of first permanent magnets 510c.

The second connection unit 521c may connect ends of the pair of second permanent magnets 511c to each other. In this case, magnetization is generated in a direction 530c from an outside to an inside of the module through the permanent magnets 510c and 511c or vice versa.

In comparison with the rotor 500a illustrated in FIG. 5A, the rotor 500c has more permanent magnets, and hence the magnetic flux can be increased by the addition of the permanent magnets 510c and 511c.

Figure 6:
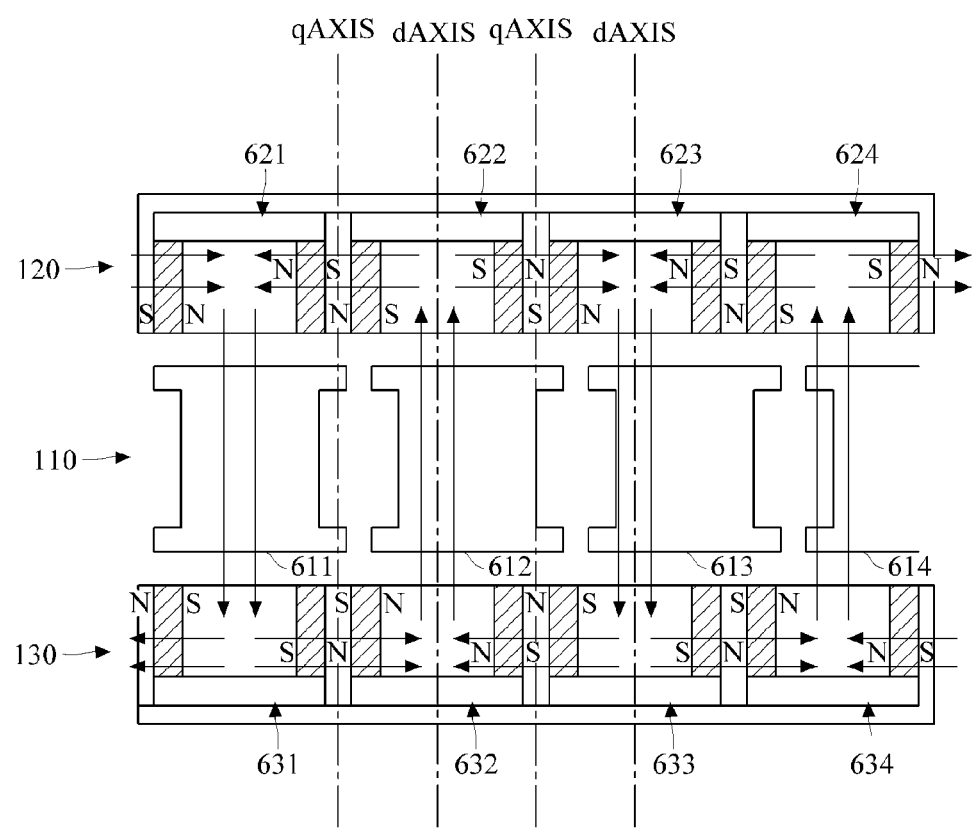
FIG. 6 is a diagram illustrating a side view of a part of a motor to explain a magnetization direction which passes through the permanent magnets illustrated in FIG. 1.

FIG. 6 is a diagram illustrating a side view of a part of a motor to explain a magnetization direction which passes through the permanent magnets illustrated in FIG. 1.

Referring to FIGS. 1 and 6, the motor 100 may include the stator 110, the first rotor 120, and the second rotor 130. Hereinafter, a q axis represents an axis passing between modules, and a d axis represents an axis passing through a module.

The stator 110 may include a first slot 611, a second slot 612, a third slot 613, and a fourth slot 614.

The first rotor 120 may include a first module 621, a second module 622, a third module 623, and a fourth module 624.

The second rotor 130 may include a fifth module 631, a sixth module 632, a seventh module 633, and an eighth module 634.

The magnetization around the first module 621 of the first core 120 shows a magnetic flux flows from the outside of the first module 120 to the inside, passing through the pair of permanent magnets of the first module 621, and then moves to the first slot 611 of the stator 110. The magnetic flux passing through the first slot 611 of the stator 110 may move to the fifth module 631 of the second core 130. The first module 621 of the first core 120 may function as an N pole, and the fifth module 631 of the second core 130 may function as an S pole.

The magnetization around the fifth module 631 of the second core 130 shows that the magnetic flux flows from the first slot 611 of the stator 110 to the inside of the fifth module 631 and passes through the pair of permanent magnets inside of the fifth module 631 to reach the sixth module 630. The magnetic flux moving to the sixth module 632 may move to the second slot 612 of the stator 110. The fifth module 631 of the second core 130 may function as an S pole, and the sixth module 632 of the second core 130 may function as an N pole.

The magnetization around the sixth module 632 of the second core 130 shows that the magnetic flux flows from the fifth module 631 and the seventh module 633 to inside of the sixth module 632, passing through the pair of permanent magnets of the sixth module 632. The magnetic flux inside the sixth module 632 may move to the second slot 612 of the stator 110. The sixth module 632 of the second core 130 may function as an N pole.

The magnetization around the second module 622 of the first core 120 shows that the magnetic flux flows from the second slot 612 of the stator 110 to the inside of the second module 622. The magnetic flux present inside of the second module 622 may move to the first module 621 and the third module 623. The second module 622 may function as an S pole, and the first module 621 and the third module 623 may function as N poles.

The magnetization direction of each of the stator 110, the first core 120, and the second core 130, thus flows as described above.

Figure 7:
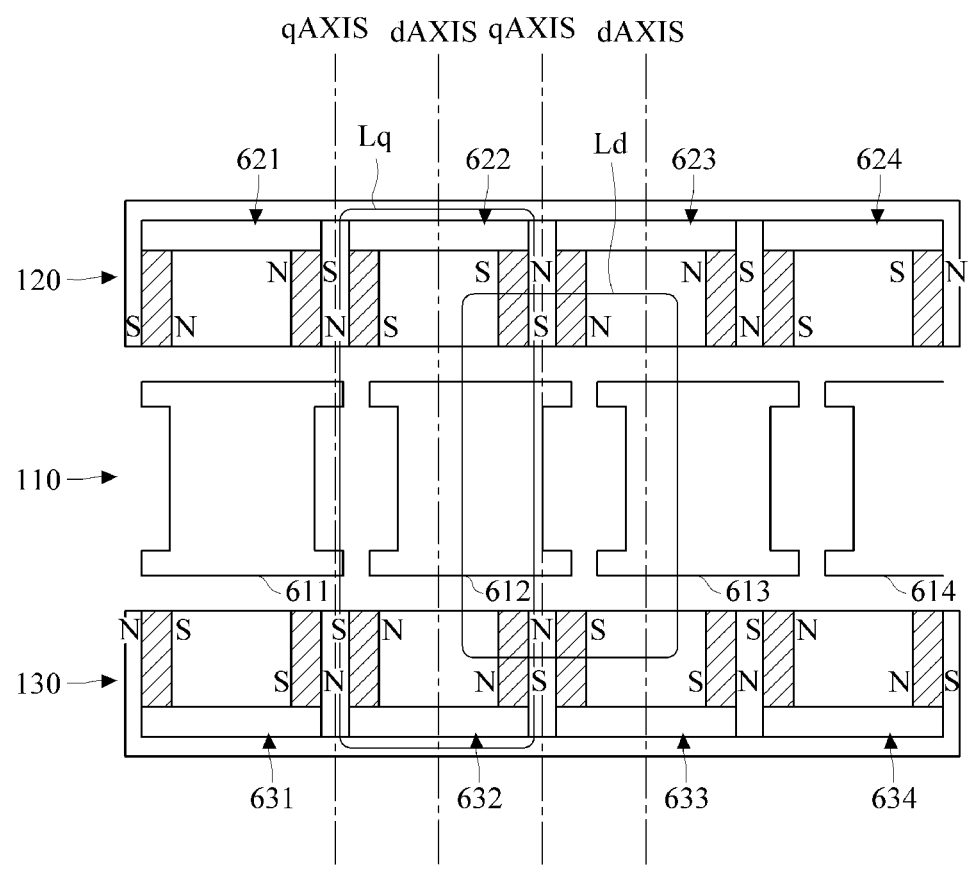
FIG. 7 is a diagram illustrating a side view of a part of a driving motor to explain magnetic flux paths of a d axis and a q axis.

FIG. 7 is a diagram illustrating a side view of a part of a driving motor to explain magnetic flux paths of a d axis and a q axis.

Referring to FIGS. 1 and 7, the motor 100 may include the stator 110, the first rotor 120, and the second rotor 130. Hereinafter, the q axis represents an axis that passes between modules and the d axis represents an axis that passes through modules.

A torque of the motor 100 may be calculated by Equation 1.

$$\text{Torque} = P_n\{\phi_f i_q + (L_d - L_q) i_d i_q\} \quad (1)$$

Here, $P_n$ denotes a magnetic dipole value, f denotes the amount of flux linkage due to a permanent magnet, $i_d$ denotes a d-axis current, $L_d$ denotes a d-axis inductance, $i_q$ denotes a q-axis current, and $L_q$ denotes a q-axis inductance.

In addition, $\phi_f i_q$ denotes a magnetic torque, and $(L_d - L_q)*i_d*i_q$ denotes a reluctance torque. During low-speed operation, mostly q-axis currents are used, and thus a torque of the driving motor is affected significantly by a magnetic torque. In contrast, during high-speed operation, q-axis currents are reduced and negative (−) d axis currents are increased, and thus the torque of the driving motor is affected significantly by a reluctance torque.

In Equation 1, $L_q > L_d$, $i_d$ is a negative (−) value, and $i_q$ is a positive (+) value. Since $L_q > L_d$, $(L_d - L_q)$ becomes a negative (−) value. Since $i_d$ is a negative (−) value and $i_q$ is a positive (+) value, the reluctance torque becomes a positive (+) value.

Referring to FIGS. 1 and 7, a magnetic flux path related to Lq passes through a gap between the stator 100 and the first rotor 120, the stator 100, a gap between the stator 100 and the second rotor 120, the first core 124 of the first rotor 120, the second core 134, the third core 125, the fourth core 135, the fifth core 126 and the sixth core 136. That is, since the only interfering factors that obstruct the magnetic flux flow are the gaps present on the path of $L_q$, such as a non-magnetic material or a magnet, it is possible to generate a large $L_q$ value.

A magnetic flux path related to Ld passes through a gap between the stator 100 and the first rotor 120, the stator 100, a gap between the stator 100 and the second rotor 130, the permanent magnets of the first rotor 120, and the permanent magnets of the second rotor 130. That is, since the gaps and the four permanent magnets present on the path of $L_d$ are interfering factors that obstruct the magnetic flux flow, it is possible to generate a small $L_d$. The four permanent magnets may significantly obstruct the magnetic flux flow.

As described above, the path of $L_q$ has the gaps as an interfering factor, such as a non-magnetic material or a permanent magnet, that obstructs the magnet flux flow, and thus it is possible to generate a large $L_q$ value. Thus, $(L_d - L_q)$ value increases, and accordingly the reluctance torque increases. Since the reluctance torque that has a large influence on the torque of the motor during high-speed operation is great, the motor 100 can maintain a high power during high-speed operation.

In addition, since the modules of the rotors 120 and 130 include, respectively, the connection units 122 and 132, the magnetic flux generated by the permanent magnets can be prevented from being leaked through the connection units 122 and 132. Thus, by preventing the magnetic flux leakage, the performance of the motor 100 may be improved.

Figure 8A:
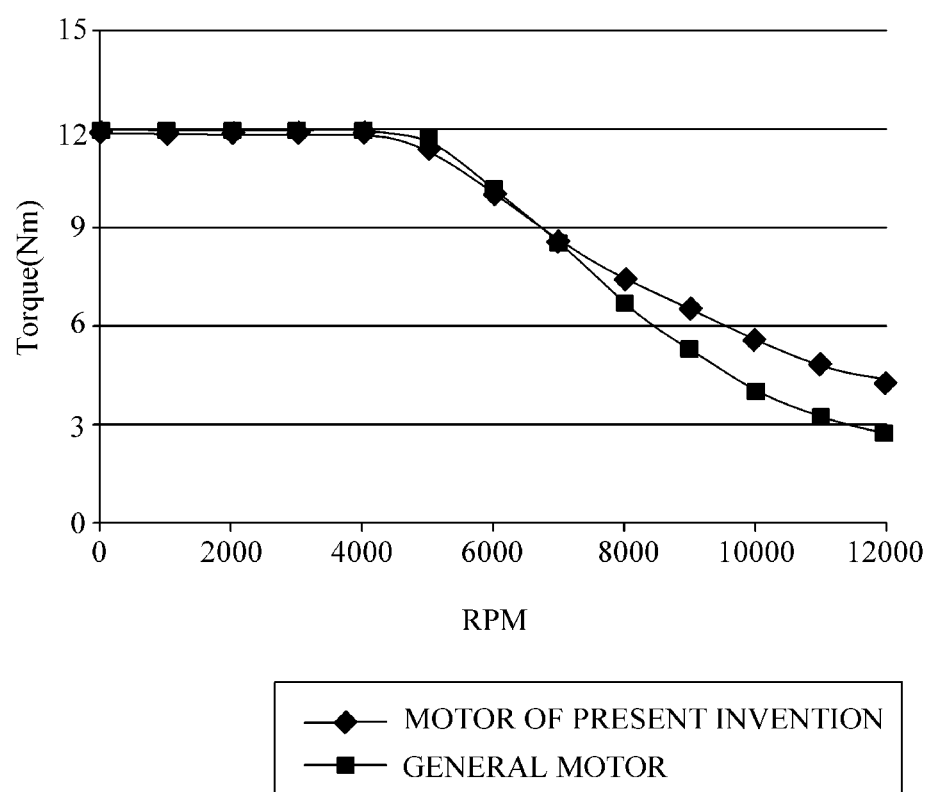
FIGS. 8A and 8B are graphs for explaining the performance of an exemplary motor.
Figure 8B:
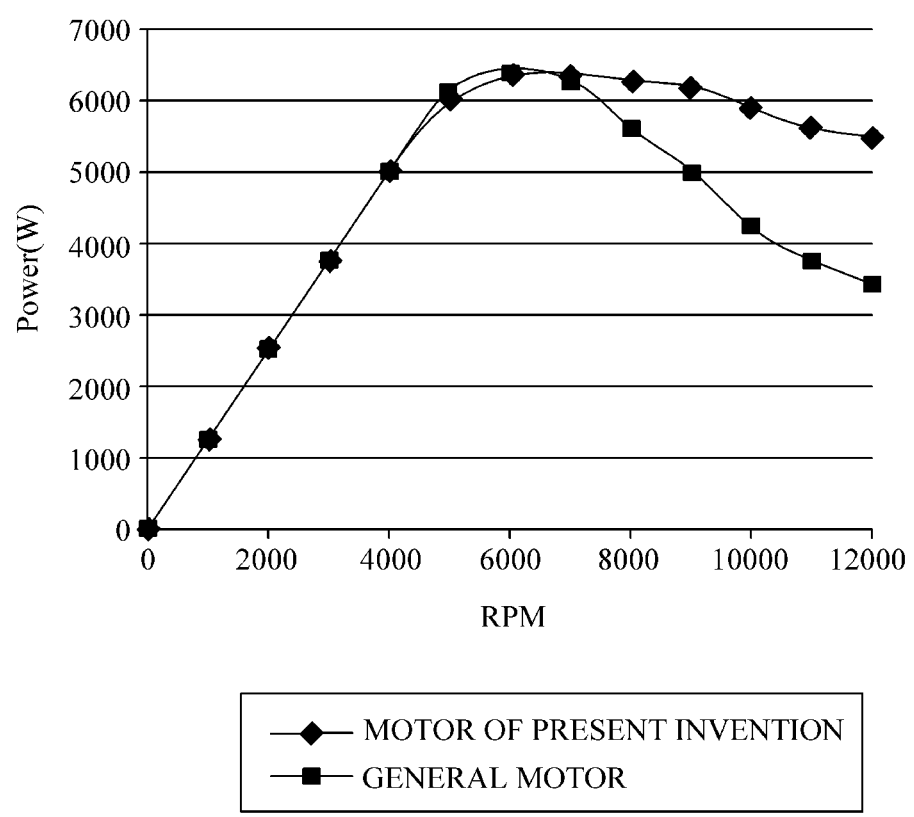

FIGS. 8A and 8B are graphs for explaining the performance of the motor described above.

Referring to FIG. 8A, the motor described above does not experience an abrupt decrease in a torque compared to a general motor even when revolutions per minute (RPM) increase. That is, the motor illustrated in the above examples may be able to maintain a large torque eve when the RPM increases. On the other hand, a general motor has a torque that drastically decreases as RPM increases.

As such, the motor in the examples can maintain a large torque during high-speed operation.

Referring to FIG. 8B, the motor in the examples does not undergo a rapid decrease in power compared to a general driving motor even when RPM increases. That is, the motor in the examples can maintain high power even if RPM increases. On the other hand, the general driving motor has a power that abruptly decreases as the RPM increases.

Hence, the driving motor illustrated in the above examples can maintain high power during high-speed operation.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A motor comprising:
a first rotor configured to be disposed on a first side of a stator and a second rotor configured to be disposed on a second side of the stator, opposite the first side;
wherein the first rotor comprises: a plurality of first modules, each of which comprises a pair of first permanent magnets, spaced apart from each other, and a first connection unit which contacts with cross-sectional ends of the first permanent magnets thereby connects the first permanent magnets,
wherein the second rotor comprises: a plurality of second modules, each of which comprises a pair of second permanent magnets, spaced apart from each other, and a second connection unit which contacts with cross-sectional ends of the second permanent magnets thereby connects the second permanent magnets,
wherein each of the plurality of first modules extends from an outer circumferential surface to an inner circumferential surface of the first rotor, and each of the plurality of second modules extends from an outer circumferential surface to an inner circumferential surface of the second rotor, and
wherein the pair of first permanent magnets of each of the plurality of first modules are arranged so that opposed magnetic poles of the pair of the first permanent magnets are of the same polarity, and the pair of second permanent magnets of each of the plurality of second modules are arranged so that opposed magnetic poles of the pair of second permanent magnets are of the same polarity.

2. The motor of claim 1,
wherein each of the first modules further comprises a first core disposed between the first permanent magnets; and
wherein each of the second modules further comprises a second core disposed between the second permanent magnets.

3. The motor of claim 2,
wherein the first rotor further comprises a plurality of third cores, each disposed between a pair of adjacent first modules; and
wherein the second rotor further comprises a plurality of fourth cores, each disposed between a pair of adjacent second modules.

4. The motor of claim 3,
wherein the first rotor further comprises a fifth core disposed on a side of the first modules; and
wherein the second rotor further comprises a sixth core disposed on a side of the second modules.

5. The motor of claim 1, wherein the plurality of first modules is an even number of first modules, spaced apart from one another, and the plurality of second modules is an even number of second modules, spaced apart from one another.

6. The motor of claim 1,
wherein each of the first connection units comprises outer portions which are made of a non-magnetic material or air, and a central portion, between the outer portions, which is made of a permanent magnet; and
wherein each of the second connection units comprises outer portions which are made of a non-magnetic material or air, and a central portion, between the outer portions, which is made of a permanent magnet.

7. The motor of claim 1, wherein each of the plurality of first connection units and each of the plurality of second connection units is made of a non-magnetic material or air.

8. The motor of claim 2, wherein each of the plurality of first cores and each of the plurality of second cores is made of a magnetic material.

9. The motor of claim 1, wherein the plurality of first modules are arranged circumferentially around the first rotor and the plurality of second modules are arranged circumferentially around the second rotor, and the first modules are offset from the plurality of second modules in a circumferential direction.

10. The motor of claim 1, wherein each of the plurality of first modules extends in a radial direction of the first rotor, and each of the plurality of second modules extends in a radial direction of the second rotor.

11. The motor of claim 1,
wherein the plurality of first modules are arranged circumferentially around the first rotor and the plurality of second modules are arranged circumferentially around the second rotor; and
the first permanent magnets extend in a direction which forms a predetermined, non-zero, angle with respect to a radius of the first rotor, and the second permanent magnets extend in a direction which forms the predetermined angle with respect to a radius of the second rotor.

12. The motor of claim 1, wherein the plurality of first modules are arranged circumferentially around the first rotor and the plurality of second modules are arranged circumferentially around the second rotor.

13. A rotor of a motor, comprising:
a plurality of modules arranged in a circumferential direction around the rotor, each of the plurality of modules comprising a pair of permanent magnets, spaced apart from each other, and a connection unit contacting with cross-sectional ends of the permanent magnets thereby connecting the permanent magnets,
wherein each of the plurality of modules extends from an outer circumferential surface to an inner circumferential surface of the rotor, and
wherein the pair of permanent magnets of each of the plurality of modules are oriented such that opposed magnetic poles of the pair of permanent magnets are of the same polarity.

14. The rotor of claim 13, wherein each of the plurality of modules further comprises:
a core disposed between the pair of permanent magnets.

15. The rotor of claim 13, further comprising:
a plurality of cores, each core disposed between an adjacent pair of the plurality of modules.

16. The rotor of claim 13, further comprising:
a core disposed on one side of the plurality of modules.

17. The rotor of claim 13, wherein the plurality of modules comprises an even number of modules.

18. The rotor of claim 13, wherein each of the connection units comprises outer portions which are made of a non-magnetic material or air, and a central portion which is made of a permanent magnet.

19. The rotor of claim 13, wherein each of the plurality of modules extends in a radial direction of the rotor.

20. The rotor of claim 19, wherein the plurality of modules are arranged circumferentially around the rotor, and the permanent magnets extend in a direction which forms a predetermined, non-zero, angle with respect to a radius of the rotor.

21. The motor of claim 1, wherein the first connection unit magnetically connects the first permanent magnets and the second connection unit magnetically connects the second permanent magnets.

22. The motor of claim 21, wherein the first connection unit and the second connection unit are permanent magnets.

23. The motor of claim 1, wherein each of the cross-sectional ends is perpendicular to longitudinal direction of each of the permanent magnet of the first permanent magnets and the second permanent magnets.

24. The motor of claim 1, wherein the cross-sectional ends are outermost from the stator in a direction parallel to a rotational axis.

* * * * *